Oct. 29, 1968  W. A. YOUNG  3,407,498
LINOLEUM SCRIBING AND CUTTING TOOL
Filed Aug. 26, 1966
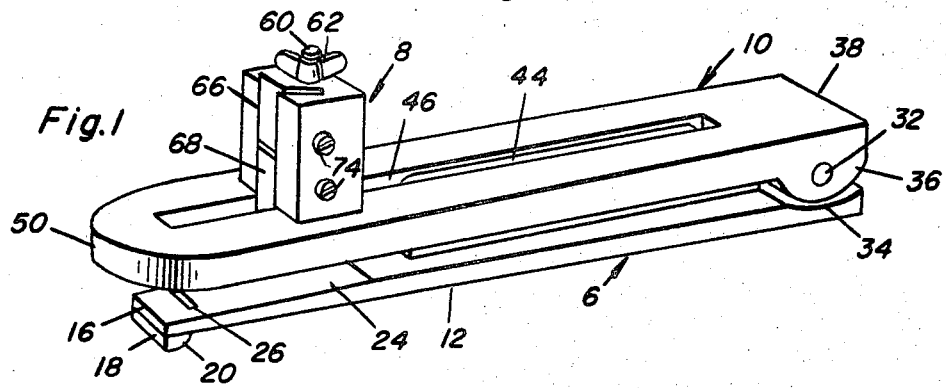
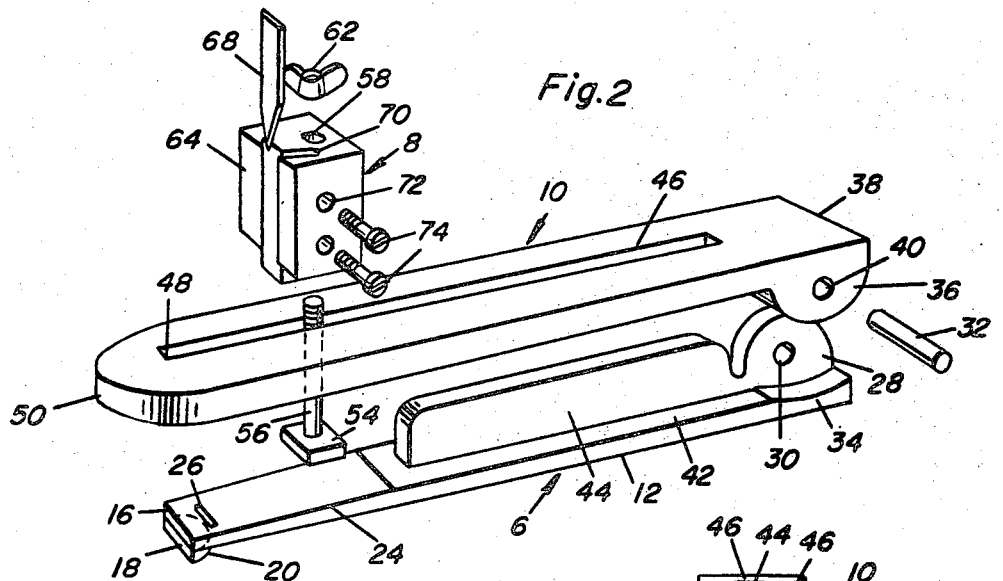
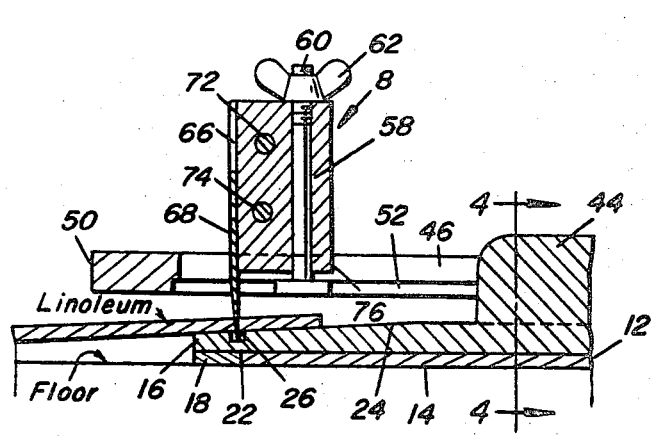
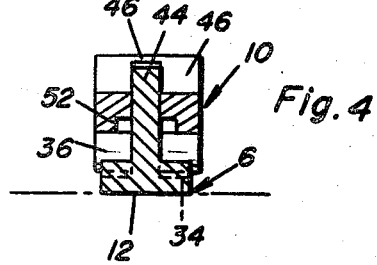
William A. Young
INVENTOR.

United States Patent Office 3,407,498
Patented Oct. 29, 1968

3,407,498
LINOLEUM SCRIBING AND CUTTING TOOL
William A. Young, 2221 17th St.,
Port Arthur, Tex. 77640
Filed Aug. 26, 1966, Ser. No. 575,417
3 Claims. (Cl. 30—293)

ABSTRACT OF THE DISCLOSURE

A tool for use when laying linoleum. It facilitates scribing and cutting seams. It comprises three component parts, namely, a base unit, a blade holder, and a complemental positioning, supporting and orientating arm for said blade holder. The arm is hinged in place and provided with a slot. The blade holder is removably seated atop the arm and equipped with a depending rib shiftably keyed in the slot. The base unit embodies a bar provided with a longitudinal rib which lodges itself in the slot when the arm is swung to assume a closed operating position, whereby to stabilize the blade holder carrying arm.

---

The present invention relates to a manually actuatable blade-equipped tool which is expressly designed and adapted for use by persons skilled in the art of laying floor covering material, linoleum for example, and has to do, more particularly, with a tool which is uniquely and reliably designed for scribing and cutting seams and which when properly handled facilitates the step of providing a neat, clean, precision-cut seam.

Persons conversant with the practice of laying linoleum are aware that it is prevailing practice to overlap adjacent or proximal lengthwise edge portions of the oriented floor-supported adhesively held face up pieces or strips. Varying practices are resorted to for scribing and subsequent cutting needs in order to provide an acceptable butt seam. To the ends desired cutting knife holders, gages and guides have been devised and offered for use by others such as for example the straight-edge blade holder and cutter shown in the Hartman Patent 1,589,156. Another cutter somewhat more analogous to but nevertheless different from the subject matter of the herein disclosed invention is revealed in a two-part cutting tool shown in a patent to Ryan, 3,079,688, and wherein, unlike the instant invention, the component parts are joined together in substantially fixed superimposed relationship in order to properly span the pieces of linoleum and the butt seam which is being cut.

An object of the present invention is to structurally, functionally and in other ways improve upon prior art scribing and cutting implements and tools. Then, too, it is an object here to devise and bring into practical use, a tool which will function to accommodate and acceptably support a type of blade holder which is in common use and is known in the trade as an Armstrong Universal Scriber.

In carrying out the principles of the present invention and looking toward the provision of an improved end product, an adaptation is utilized which is characterized, broadly speaking, by three individual but associatively cooperable component parts. To the ends desired one component part comprises a base unit. A second companion part comprises an Armstrong-type blade holder and the third part comprises a supporting, orienting and properly coordinated positioning arm for the blade holder, that is, an arm which permits the blade holder to be attached, detached and adjusted.

More specifically, novelty is deemed to reside in the adoption and use of a highly feasible base unit. This unit comprises an elongated rigid bar or plate which has a leading or forward terminal end and a rearward end, the latter end provided with means for hingedly attaching the blade holder arm thereto so that the forward end of the arm can be opened and closed to facilitate piloting the tool into place and so that the leading end of the base unit or plate can be wedged with requisite nicety between the overlapping edges of the two strips or pieces of linoleum.

Another feature of the invention resides in the provision of a simple cleat which is fixedly mounted on the underneath side of the leading or forward end of the plate, said cleat being of requisite thickness and having an arcuately curved edge which abuts the coacting edge of the strip of linoleum to permit the overall tool to be manually manipulated whether being pushed or pulled as the case may be.

A further feature resides in providing the median upper side of the bar or plate with an upstanding rib which projects up into a slot provided therefor in the hinged arm thus providing stability for the arm when the arm is swung down to its scribing and cutting position.

Then, too, novelty is predicated on providing the bottom of the block-like blade holder with a rib which is keyed slidingly in the above-named slot.

Further novelty is predicated on providing a headed bolt which is carried by the block-like blade holder and wherein the head of the bolt is slidable in the keying grooves which provide guide channels in the underneath side of the slotted arm.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a linoleum scribing and cutting tool constructed in accordance with the principles of the invention showing the same set up for use.

FIG. 2 is a view in perspective wherein all of the component parts are individually shown in exploded relationship to thus bring out the construction of the features thereof.

FIG. 3 is a view on a slightly enlarged scale with the parts in section and elevation and which shows the manner in which the base unit and arm unit cooperate with the overlapping edges of the linoleum strips and wherein the blade holder is bolted in place to provide the butt seam desired.

And FIG. 4 is a section taken on the vertical section line 4—4 of FIG. 3.

The three principal component parts referred to above are individually designated here. This is to say, the base unit is denoted by the numeral 6, the Armstrong-type blade holder by the numeral 8 and the accommodating supporting and adjusting arm by the numeral 10.

The unit 6 comprises an elongated bar or plate of suitable lightweight metal which is provided with a flat smooth bottom surface 12 which is adapted to be placed atop the up facing surface of the strip or piece of linoleum 14 in the manner suggested in FIG. 3. The leading or terminal forward end portion of the bar is denoted at 16 and is provided on its underneath side with a simple semicircular cleat 18 which is fixed in place and which has an arcuate guiding edge 20 which is of the curvature shown to permit the edge to ride against the crown of the lengthwise edge portion 22 of the linoleum strip 14 in the manner illustrated in FIG. 3. It will be noted that the upper surface of this end portion of the bar or plate is gradually decreased in thickness from right to left to provide a bevel or tapering surface 24 which can be readily piloted and wedged into the interposed position and relationship illustrated in FIG. 3. The median part of the surface 24 is provided with a clearance recess 26. The right hand or rearward end portion of the upper side of the plate is provided centrally with an upstanding assembling lug or ear 28 having a hole 30 therein for reception of the assembling and hinging pin 32. Opposite sides of the upper surface are arcuately recessed as at 34 to provide clearance for the curvate edges of the spaced parallel ears or lugs 36 carried by the corresponding rearward end portion 38 of the aforementioned arm 10. These ears are provided with holes 40 which register with the hole 30 to accommodate the hinge pin 32. The median part of the upper side 42 of this plate is provided with a centralized elongated flange which constitutes a stabilizing rib 44.

Taking up now the arm 10 it will be seen that this comprises a rigid elongated generally rectangular plate which is of a length slightly greater than the length of the base plate 6. This arm is provided with a lengthwise slot 46 which opens through the top and bottom surfaces in the manner shown in FIG. 3. The closed forward end 48 of the slot terminates inwardly of the rounded terminal inner end portion 50 of the arm, said portion extending slightly beyond the cleat or shoe 18. With reference again to FIG. 3 it will be seen that lengthwise grooves 52 are also provided to accommodate a head 54 on an assembling and adjusting bolt 56. The shank of the bolt extends upwardly through a bolt hole 58 provided in the block-like body of the blade holder 8. The upper end of the shank is screw-threaded as at 60 to accommodate a bolt assembling and retaining nut 62. A groove 66 is provided in the vertical face 64, said groove serving to accommodate the insertable and removable scribing and cutting blade 68. It will be noted that there is a kerf 70 provided to facilitate clamping the blade in place and, in addition, auxiliary bolt holes or sockets 72 are provided to accommodate the binding bolts or screws 74. Attention is also directed to the bottom portion of the block which is provided with a central key 76 (FIG. 3) which is keyed removably and adjustably in an end portion of the slot 46.

It is submitted that the component parts of the tool are clearly illustrated in FIG. 2 and that the relationship of the parts is evident in FIGS. 1, 3 and 4. Moreover, FIG. 3 shows the manner in which the base unit and arm unit are installed to accommodate the attachable and detachable as well as adjustable blade holder 8. It is submitted that the manner in which the tool is used is evident from FIG. 3 and that a more detailed description is accordingly unnecessary.

In conclusion it can be added that the guide shoe or cleat 18 with its curvate surface 20 is believed to be large enough and so arranged as to pick up excess glue and roll it against the sheet of material thus actually coating the edges of the seam with glue.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A linoleum cutting tool comprising, in combination, three individual but associatively cooperable component parts: (1) a base unit, (2) a blade holder, and (3) a positioning, supporting and orienting arm for said blade holder; said base unit embodying an elongated bar having a smooth flat underneath side adapted to reside firmly and flatwise atop the upfacing surface of a first piece of floor-supported adhesively attached linoleum and having a terminal end projecting and overhanging a free edge of said piece of linoleum, said terminal end provided on an underneath surface with a fixed depending tool positioning and guide shoe adapted to abut and ride guidingly along said free edge when said base unit is pushed along said surface by the user of the tool, said terminal end adapted to be interposed and sandwiched between the free edge of said first piece of linoleum and the underneath surface of the usual overhanging free edge of a second complemental piece of linoleum, said arm being commensurate in length with, disposed in a plane directly above said base unit, having a rearward end hingedly joined to a corresponding rearward end of said base unit and a forward end projecting beyond the terminal forward end of said base unit, said guide shoe comprising a relatively small cleat-like abutment superimposed upon and fixed to said underneath surface and having a semicircular edge the median crest portion of which is designed and adapted to abut and glide freely along said free edge and which assists in applying excess adhesive media along said free edge, said arm being provided with a centralized lengthwise slot closed at its ends and providing a keyway, said blade holder being removably seated and wholly exposed atop said arm and having a keying and steadying rib slidingly but removably keyed in said keyway, said bar having its top side provided with an integral upstanding flange constituting a stabilizing rib, said stabilizing rib projecting into said slot when said arm is swung down and placed in a closed operating position, said blade holder comprises a block-like member having, a vertical face having a groove into which a blade is removably accessibly fitted, said block-like member having a vertical bolt hole, a bolt having a shank fitting into and through said hole, the upper end of said shank provided with a thumb nut, the lower end of said shank having a head in a plane below said keying rib, the slotted portion of said arm having spaced parallel longitudinal groove means in its underneath side, and said bolt head being slidingly keyed in said longitudinal groove means.

2. A linoleum scribing and cutting tool comprising, in combination, a base unit characterized by an elongated bar-like plate having a flat smooth-finished underneath side capable of being positioned flatwise and manually pushed or pulled along the upfacing surface of a first piece of adhesively attached floor-supported linoleum, said plate having a terminal forward end capable of projecting beyond and overhanging a free lengthwise edge of said piece of linoleum and being provided on an underneath surface with a relatively small cleat-like abutment constituting and providing an edge abutting shoe, said cleat having an arcuate edge whose crown portion is adapted to engage and ride slidingly along said free lengthwise edge, the upper surface of said terminal end portion being planar and sloping toward said terminal end and being thus contoured and adapted to be piloted and easily wedged into a position between the free edge of said first piece of linoleum and the underneath surface of the customary overlying free edge portion of a second piece of floor-supported linoleum complemental to said first piece of linoleum, the median lengthwise portion of the upper surface of said plate having a fixed longitudinally straight upstanding stabilizing flange, the rearward end portion of said plate having an upstanding hinging ear, an arm complemental to and disposed in a plane above the top side of said plate, the rearward end of said arm having a pair of arm assembling ears straddling and hingedly joined to said first named ear, said arm being of a length slightly greater than the length of said plate and having its forward end free and projecting beyond the corresponding forward end of said plate, said arm having a longitudinal slot of a length greater than the length of said flange and said flange being aligned with and fitted into said slot when the arm is closed down in a manner to stabilize the overall arm, and a wholly exposed block-like member bodily attachable and detachable and constituting a blade holder and having an accessible vertical surface with a positioning and retaining groove for an insertable and removable blade, the bottom of said member being slidingly seated atop said arm and having a depending rib slidingly but clampingly keyed in a cooperating end portion of said slot.

3. A linoleum scribing and cutting tool comprising, in combination, a base unit characterized by an elongated bar-like plate having a flat underneath side capable of being positioned flatwise and manually pushed or pulled along the upfacing surface of a first piece of adhesively attached floor-supported linoleum, said plate having a terminal forward free end capable of projecting beyond and overhanging a free marginal edge of said piece of linoleum and being provided on an underneath surface with a relatively small cleat-like abutment constituting and providing an edge abutting and guiding shoe, said abutment having an arcuate edge embodying a crown portion adapted to engage and ride slidingly along said free marginal edge, the upper surface of said terminal end portion being planar and sloping toward said terminal end portion, the median lengthwise portion of the upper surface of said plate having a fixed longitudinally straight upstanding stabilizing flange midway between the opposite longitudinal edges of said bar-like plate, the rearward end portion of said plate having an upstanding hinging ear, an arm complemental to and disposed in a plane above the top side of said plate, the rearward end of said arm having ear means hingedly joined to said first named ear, said arm being of a length slightly greater than the length of said plate and having its forward end free and projecting beyond the corresponding forward end of said plate, said arm having a longitudinal slot of a length greater than the length of said flange and said flange being aligned with and fitted into said slot when the arm is closed down in a manner to stabilize the overall arm, and a wholly exposed bodily attachable and detachable block-like member constituting a blade holder, the bottom of said block-like member being primarily flat and slidingly seated atop said arm and being centrally provided with a depending rib slidingly but clampingly bolted in a cooperating end portion of said slot.

References Cited

UNITED STATES PATENTS

| | | | |
|---|---|---|---|
| 1,993,132 | 3/1935 | Cathcard | 33—41 |
| 2,815,572 | 12/1957 | Deicken | 30—289 |
| 2,880,506 | 4/1959 | Zimmerman | 30—293 |
| 3,276,119 | 10/1966 | Brucher | 30—289 |

JAMES L. JONES, JR., *Primary Examiner.*